United States Patent Office 3,261,680
Patented July 19, 1966

3,261,680
HERBICIDAL COMPOSITION AND METHOD
John M. Deming, Hazelwood, Mo., assignor to Monsanto Company, St. Louis, Mo., a corporation of Delaware
No Drawing. Filed May 11, 1965, Ser. No. 454,979
12 Claims. (Cl. 71—2.7)

The present application is a continuation-in-part of my copending application, Serial No. 193,012, filed May 7, 1962, now abandoned.

This invention relates to improved phytotoxic compositions, and more specifically, to compositions which provide optimum efficiency in use. In the practice of this invention, greater pre-emergent growth inhibition of objectionable plant life can be obtained with minimum amounts and low concentrations of herbicide.

During recent years there has been an increasing trend in the use of dry herbicidal compositions which are referred to as "granular herbicides." This is due to certain inherent objectionable features in the use of sprays of solutions or emulsions, which for a long time have been conventional practices. It is well known that sprays cannot be controlled adequately to avoid injuring crops in adjacent fields. Furthermore, the large volumes of water required in the preparation of solutions or emulsions create serious problems due to the weight of water required in the preparation of sufficiently dilute formulations to enable a uniform treatment of the soil. It has been found impracticable to build equipment with sufficient tank volumes to cover a reasonable area without frequent reloading.

The use of granular herbicides is convenient and economical in providing for a uniform and effective application of a product to the soil. This is particularly important where the quantity applied is critical either in the application of a sufficient amount to permit herbicidal activity without an excessive amount which might inhibit the growth of desirable plants. These compositions are conventionally prepared by applying the herbicidally active compound to preformed particles of an inert carrier having a relatively uniform particle size. Generally, a range of particles from 10–100 mesh is used, but best performance is obtained from more uniform sizes of particles, for example, 14 to 80 mesh with a large majority (about 80 percent) of the particles between 20 and 40 mesh (U.S. Sieve Series). Attapulgus clay is often used but possesses certain inherent disadvantages.

The prior art granular herbicides have the ability to absorb certain volatile herbicidal compounds but the absorbtion forces are not strong enough to prevent the desorbtion and loss of the active component to the atmosphere. Furthermore, if the active compounds are soluble, the active compound may be leached from the carrier and lost in the soil water.

The herbicidal compounds used in the practice of this invention are the α-chloroacetamides having from 1 to 2 short aliphatic substituents on the amide nitrogen atom. These have been extensively used as grass specific herbicides and have been most often used in solid form absorbed on attapulgus clay granules. These compounds include N,N-dimethyl α-chloroacetamide, N-ethyl α-chloroactamide, N,N-diethyl α-chloroacetamide, N-propyl α-chloroacetamide, N,N-dipropyl α-chloroacetamide, N-allyl α-chloroacetamide, N,N-diallyl α-chloroacetamide, N(n-butyl) α-chloroacetamide and N,N-propargyl α-chloroacetamide. The hydrocarbon substituents may have up to six carbon atoms but the optimum chain length is two or three carbon atoms.

These compounds can be represented by the general formula

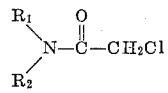

wherein $R_1$ and $R_2$ are substituents selected from the group consisting of hydrogen and straight chain linear hydrocarbon radicals of one to four carbon atoms, provided that not more than one of the $R_1$ and $R_2$ substituents is hydrocarbon.

It has been found that a granular activated charcoal provides a superior carrier for the α-chloroacetamides with the aliphatic substituents as described above.

The activated charcoal has a greater affinity for organic compounds than prior art carriers and especially for the α-chloroacetamide herbicides. Charcoal granules impregnated with the herbicide will manifest a very low vapor pressure and very little, if any, of the active component is lost to the atmosphere in the normal use of the compound. Similarly, the activated charcoal carrier retains the herbicide even in the presence of soil water. Many of the acetamides have substantial solubilities in water but little leaching takes place. It is believed that the herbicidal activity is due to the traces of active components which pass into the soil water. This slow evolution of herbicide from the carrier enables a much greater longevity.

Although the activated charcoal containing only the herbicidally active component is complete and capable of immediate usage, it is often found desirable to use adjuvants for the modification of the properties. If desired, solvents may be added, for example, kerosene, naphtha, and fuel oil, each being immiscible in water, render the particles more stable to the presence of moisture and capable of longer life in the presence of high soil water concentrations. On other occasions it may be desirable to incorporate compounds with surface-active properties so as to increase their affinity for water or to provide for more uniform distribution of the particles. Other adjuvants for the purpose of providing special properties, for example, compounds having herbicidal activity with respect to plant species resistant to the said α-chloroacetamides or active against other objectionable soil organisms, such as nematodes, insect larvae, fungi, bacteria and the viruses, may be added.

It has been found that herbicidal activity of the α-chloroacetamides can be enhanced by the addition of other compounds. If trichlorobenzyl chloride is added to the α-chloroacetamides, a much broader spectrum of activity is attained. Weeds of many different additional genera will be successfully destroyed by the herbicides containing both the α-chloroacetamides and trichlorobenzyl chloride. This mixture will also have a more complete effect than either component alone and in this respect a synergistic activity will be observed, the mixture having a greater effect than the same amount of either compound will attain. From 2 to 5 parts by weight of each component may be used, for example, from 10 to 25 percent of each in the granular product.

The following examples set forth specific formulations which may be used in the practice of this invention.

Example 1

In this and the following examples the beneficial effect of the herbicide composition of this invention is compared with herbicidal compositions containing the same active acetamide, N,N-diallyl α-chloroacetamide (CDAA). The activity and beneficial result is determined by measuring the quantity of the new composition required to effect the same control as is accomplished by the 4 pounds of CDAA when formulated as 20 percent by weight on granulated Attapulgus clay.

A farm soil containing weed seeds predominately those of crabgrass and foxtail is treated with CDAA as 20 percent on both granules of activated charcoal and granulated Attapulgus clay. It was found that 1.0 pound per acre of CDAA on the charcoal carrier accomplished the same weed control as did 4.0 pounds of CDAA on granular Attapulgus clay.

*Example 2*

The procedure of Example 1 was repeated on the same plot used for Example 1, at a later date when soil conditions were changed (soil moisture, humidity, temperature, and hours of sunlight).

It was found that 2.0 pounds per acre of CDAA formulated as 20 percent on charcoal granules provided the same weed control as 4 pounds of CDAA formulated on Attapulgus clay granules.

*Example 3*

The procedure of Examples 1 and 2 was repeated on the same plot at a later date when soil conditions had again changed.

It was found that 1.20 pounds of CDAA formulated as 20 percent on activated charcoal granules provided the same weed control as 4 pounds of CDAA formulated as 20 percent on granular Attapulgus clay.

*Example 4*

The procedure of Example 1 was repeated except that 2 pounds of CDAA formulated as a 20 percent concentration on granular activated charcoal was found to provide the same weed control as 4 pounds of CDAA on Attapulgus clay granules.

*Example 5*

The procedure of Example 3 was repeated at the same time, but on three different plots of soil. The following table sets out the measurements of the quantity of CDAA when formulated as 20 percent on activated charcoal granules required to accomplish the same weed control as 4 pounds of CDAA on granular Attapulgus clay.

| Pounds CDAA on activated charcoal: | Pounds CDAA on Attapulgus clay |
|---|---|
| (1) 2.1 | 4.0 |
| (2) 0.6 | 4.0 |
| (3) 1.1 | 4.0 |

In the practice of this invention it has been found that activated charcoal particles having adsorbed therein from 5 to 30 percent by weight of the N-substituted α-chloroacetamide will provide useful compositions. A 20 percent formulation is a composition for general use, but lower concentration, for example, 5 to 15 percent, sometimes provides economical advantages in the use of minimum quantities of the active components.

The compositions described herein are used to control growth of grasses and other weeds pre-emergently in soils. The herbicidal procedure may be used before seeds are planted or after the soil is seeded. The composition may be deposited uniformly on the surface of the soil, and, if desired, a light cultivation to a shallow depth may be done so as not to disturb the planted seeds. If the soil is treated before the seeding, the seed bed should be prepared and the planting operation should not involve extensive mixing of the herbicide composition with the soil.

The compositions should be applied in a herbicidal amount which is usually one-tenth to 10 pounds per acre based on the α-chloroacetamide component.

The details of the above examples are not intended to be limitations on the scope of the invention except to the extent incorporated in the following claims.

What is claimed is:

1. A herbicidal composition comprising activated charcoal particles containing per 100 parts by weight of charcoal, from about 5 to about 30 parts of an α-chloroacetamide of the structure

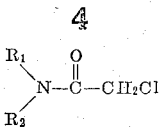

wherein $R_1$ and $R_2$ are substituents selected from the group consisting of hydrogen and straight chain linear hydrocarbon radicals of one to six carbon atoms, provided that not more than one of the $R_1$ and $R_2$ substituents is hydrogen, substantially all of the charcoal particles being between 10 and 100 mesh.

2. A herbicidal composition comprising activated charcoal particles containing from about 10 to about 25 parts, per 100 parts by weight of charcoal, of an α-chloroacetamide of the structure

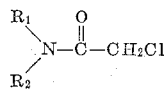

wherein $R_1$ and $R_2$ are normal aliphatic hydrocarbon radicals having from 2 to 3 carbon atoms, substantially all of the charcoal particles being between 14 and 80 mesh.

3. A herbicidal composition comprising activated charcoal particles containing from about 10 to about 25 parts of N,N-diallyl α-chloroacetamide per 100 parts by weight of charcoal, substantially all of the charcoal particles being between 14 and 80 mesh, and at least about 80 percent of the charcoal particles being between 20 and 40 mesh.

4. A herbicidal composition comprising activated charcoal particles containing from about 10 to about 25 parts of N,N-diethyl α-chloroacetamide per 100 parts by weight of charcoal, substantially all of the charcoal particles being between 14 and 80 mesh, and at least about 80 percent of the charcoal particles being between 20 and 40 mesh.

5. A herbicidal composition comprising activated charcoal particles containing from about 10 to about 25 parts of N,N-di-n-propyl α-chloroacetanilide per 100 parts by weight of charcoal, substantially all of the charcoal particles being between 14 and 80 mesh, and at least about 80 percent of the charcoal particles being between 20 and 40 mesh.

6. A herbicidal composition comprising activated charcoal particles containing from about 10 to about 25 parts of N,N-dimethyl α-chloroacetamide per 100 parts by weight of charcoal, substantially all of the charcoal particles being between 14 and 80 mesh, and at least about 80 percent of the charcoal particles being between 20 and 40 mesh.

7. A herbicidal composition comprising activated charcoal particles containing from about 10 to about 25 parts of N,N-dipropargyl α-chloroacetamide per 100 parts by weight of charcoal, substantially all of the charcoal particles being between 14 and 80 mesh, and at least about 80 percent of the charcoal particles being between 20 and 40 mesh.

8. A method of inhibiting the growth of plants in soil which comprises treating the soil with a phytotoxic amount of an α-chloroacetamide of the structure

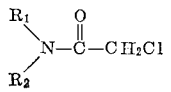

wherein $R_1$ and $R_2$ are radicals selected from the group consisting of hydrogen and straight chain linear hydrocarbon radicals of up to six carbon atoms, provided that not more than one of the $R_1$ and $R_2$ radicals in hydrogen, from about 5 to about 30 parts by weight of said α-chloroacetamide being adsorbed to 100 parts activated charcoal particles between 10 and 100 mesh.

9. A method of inhibiting the growth of plants in soil which comprises applying to the soil from one-tenth to 10 pounds per acre of an α-chloroacetamide of the structure

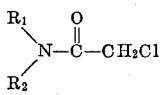

wherein $R_1$ and $R_2$ are normal aliphatic hydrocarbon radicals having from 2 to 3 carbon atoms, said α-chloroacetamide being applied to the soil as a composition comprising activated charcoal particles containing from about 10 to about 25 parts by weight of said α-chloroacetamide per 100 parts by weight of charcoal, substantially all of the charcoal particles being between 14 and 80 mesh and at least about 80 percent of the charcoal particles being between 20 and 40 mesh.

10. A method of inhibiting the growth of plants in soil which comprises applying to the soil a phytotoxic composition comprising activated charcoal particles containing from about 5 to about 30 parts by weight of N,N-diallyl α-chloroacetamide per 100 parts by weight of charcoal, substantially all of the charcoal particles being between 14 and 80 mesh and at least about 80 percent of the charcoal particles being between 20 and 40 mesh.

11. A method of inhibiting the growth of plants in soil which comprises applying to the soil a phytotoxic composition comprising activated charcoal particles containing from about 5 to about 30 parts by weight of N,N-diethyl α-chloroacetamide per 100 parts by weight of charcoal, substantially all of the charcoal particles being between 14 and 80 mesh and at least about 80 percent of the charcoal particles being between 20 and 40 mesh.

12. A method of inhibiting the growth of plants in soil which comprises applying the soil a phytotoxic composition comprising activated charcoal particles containing from about 5 to about 30 parts by weight of N,N-dipropyl α-chloroacetamide per 100 parts by weight of charcoal, substantially all of the charcoal particles being between 14 and 80 mesh and at least about 80 percent of the charcoal particles being between 20 and 40 mesh.

References Cited by the Examiner

UNITED STATES PATENTS

| 2,031,308 | 2/1936 | Grullemans | 71—2.4 |
| 2,864,683 | 12/1958 | Hamm et al. | 71—2.5 |
| 2,891,855 | 6/1959 | Gysin et al. | 71—2.5 |
| 2,974,030 | 3/1961 | Geary. | |
| 3,074,845 | 1/1963 | Geary. | |

LEWIS GOTTS, *Primary Examiner.*

JAMES O. THOMAS, JR., *Examiner.*